United States Patent

Suzuki

[11] Patent Number: 6,004,236
[45] Date of Patent: Dec. 21, 1999

[54] BELT-DRIVE MECHANISM

[75] Inventor: Takeshi Suzuki, Yamagata, Japan

[73] Assignee: NEC Corporation, Tokyo, Japan

[21] Appl. No.: 09/106,255

[22] Filed: Jun. 29, 1998

[30] Foreign Application Priority Data

Jun. 30, 1997 [JP] Japan .................................. 9-174651

[51] Int. Cl.$^6$ .............................. F16H 7/14; F16H 7/08
[52] U.S. Cl. ........................ 474/115; 474/117; 474/101
[58] Field of Search .................................. 474/115, 113, 474/114, 116, 117, 138, 133, 110, 101, 108, 109, 122

[56] References Cited

U.S. PATENT DOCUMENTS

| | | | |
|---|---|---|---|
| 2,146,687 | 2/1939 | Regan | 474/109 X |
| 3,901,563 | 8/1975 | Day | 474/110 X |
| 4,977,708 | 12/1990 | Kloft | 474/117 X |
| 4,983,146 | 1/1991 | Charles et al. | 474/117 |
| 5,183,441 | 2/1993 | Urda | 474/117 X |
| 5,199,502 | 4/1993 | Hirata et al. | 474/122 X |

FOREIGN PATENT DOCUMENTS 3-227678  10/1991  Japan .

*Primary Examiner*—Tamara L. Graysay
*Assistant Examiner*—Marcus Charles
*Attorney, Agent, or Firm*—Whitham, Curtis & Whitham

[57] ABSTRACT

To provide a belt-drive mechanism wherein the tension degradation of the circular belt and slips of the dviving pulley are prevented, and a precise tension adjustment of the circular belt is enabled aw well, a belt-drive mechanism, having a fixed pulley (24), an adjust pulley (26), a circular belt (25), and an adjustment assembly (41) for adjusting distance between the fixed pulley (24) and the adjust pulley (26) by shifting position of the adjust pulley (26), comprises a pair of fastening members (32) for fixing the distance after the distance is adjusted. The adjustment assembly (41) comprises: a coupling member (31) having a screw hole (30); a pair of elastic members (32) for tensioning the shaft (27) outward of the circular belt (25); and an adjusting screw (29) set through a hole of another supporting face (28) to be screwed into the screw hole (30) of the coupling member. Each of the fastening members (32) has fitting holes (40) whereto tips of the shaft (27) and the coupling member (31) are to be engaged.

6 Claims, 3 Drawing Sheets

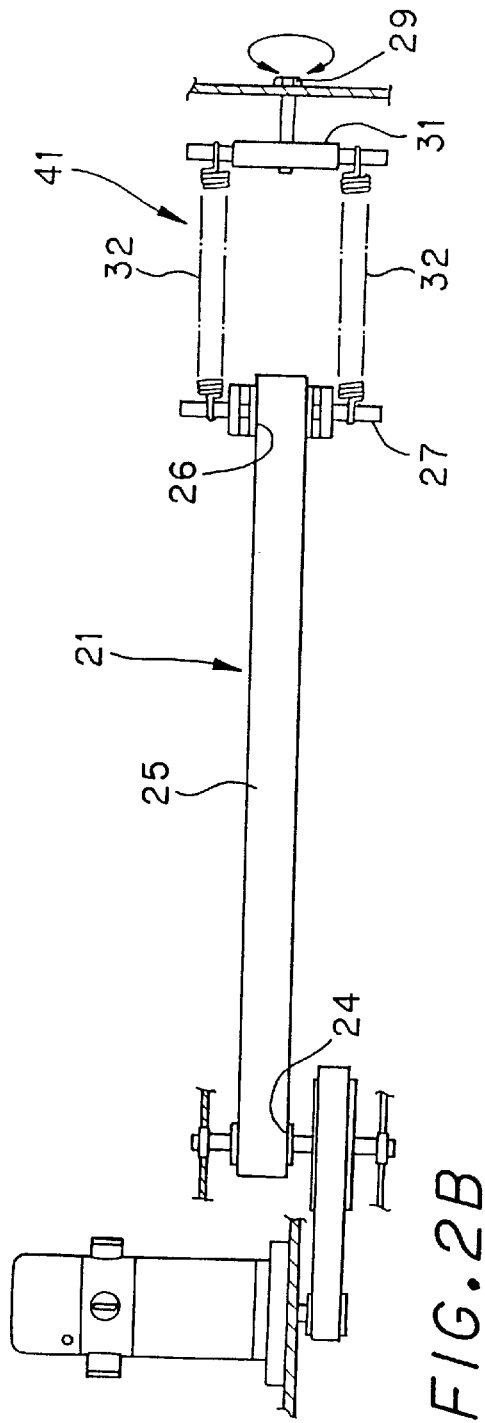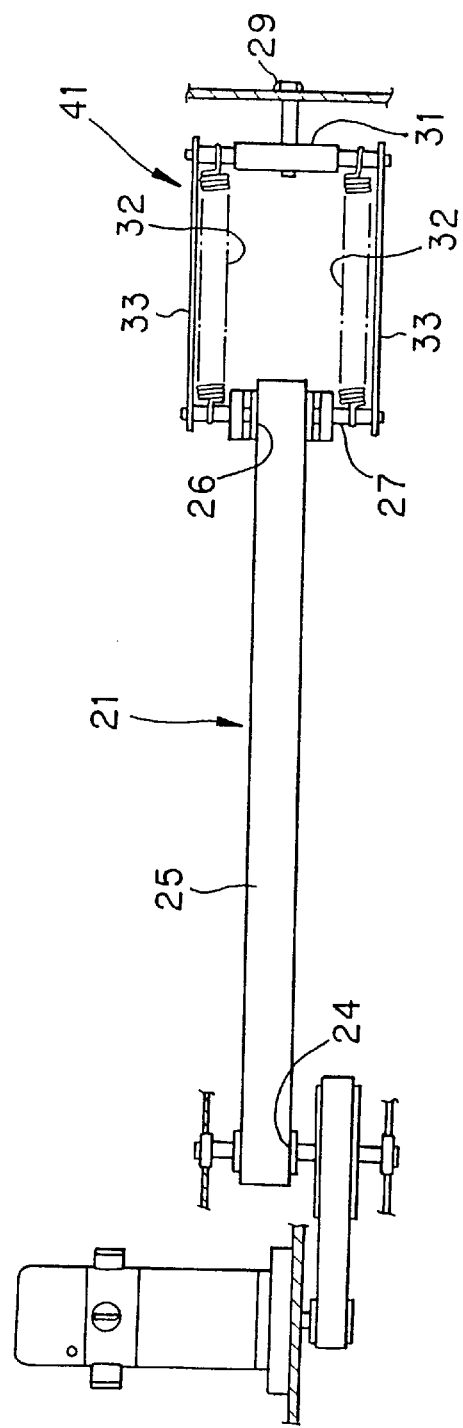

BELT-DRIVE MECHANISM

BACKGROUND OF THE INVENTION

The present invention relates to a belt-drive mechanism to be used for driving mechanical devices such as a serial printer.

The belt-drive mechanism, which is composed of pulleys and a circular belt rounding around the pulleys, is used in various mechanical devices for transmitting rotary movement generated by a motor, by way of a driving pulley connected to the motor and the circular belt, to a driven mechanism connected to a driven pulley.

In the belt-drive mechanism, there is a problem of dispersion of length of the circular belt or distance between the pulleys, which may cause slips of the pulley because of lack of belt tension, or may make it difficult to set the circular belt to the pulleys because of lack of belt length. For dealing with this problem, various devices have been proposed.

FIG. 3 is a perspective view illustrating a belt-drive mechanism 1 disclosed in a Japanese patent application laid open as a Provisional Publication No. 227678/'91 for dealing with the above problem.

Referring to FIG. 3, the belt-drive mechanism 1 comprises a fixed pulley 4 which is set able to rotate around a shaft 3 provided at an end of a frame 2, a circular belt 5, and a driving pulley 7 coupled to a motor 6.

At the other end of the frame 2, there are provided a pulley hole 8 through which the driving pulley 7 is set, a fulcrum hole 10 through which a fulcrum screw 9 is set, and a long hole 12 having an arc shape through which a rotation screw 11 is set.

The belt-driving mechanism 1 comprises also an adjust plate 13, having an adjust plate pulley hole 14 through which the driving pulley 7 is set, and two through-holes 15 through which the fulcrum screw 9 and the rotation screw 11 are set.

With the fulcrum screw 9 and the rotation screw 11, which are both screwed into the motor 6 passing through bushes 16, the frame 2 and the adjust plate 13, the driving pulley 7 is fixed to the adjust plate 13, and set to the frame 2.

The driving pulley 7 fixed to the adjust plate 13 is able to swing around the fulcrum screw 9 against the frame 2, as the rotation screw 11 is set able to slide in the long hole 12.

For tensioning the adjust plate 13, a spring 19 is provided between a salient 17 of the adjust plate 13 and a heel piece 18 of the frame 2, in the belt-drive mechanism 1. The driving pulley 7 is tensioned to go away from the fixed pulley 4, as the adjust plate 13 is tensioned to swing counterclockwise, in FIG. 3, around the fulcrum screw 9.

Being thus assembled, the circular belt 5 of the above belt-driving mechanism 1 can be easily set around the driving pulley 7 and the fixed pulley 4 even when the size of the circular belt 5 is made a little shorter, since the distance between the driving pulley 7 and the fixed pulley 4 is adjustable by rotating the adjust plate 13, whereto the driving pulley 7 is fixed, against the frame 2.

Furthermore, as the driving pulley 7 is tensioned to go away from the fixed pulley 4 by the spring 19, an appropriate tension can be given to the circular belt 5 for preventing slips of the driving pulley 7, in the belt-drive mechanism 1.

However, a problem with the above belt-drive mechanism 1 is that the tension of the spring 19, and consequently, the tension of the circular belt 5 is degraded because of fatigue of the spring 19 according to time passage.

Another problem is the above belt-drive mechanism 1 is that a slip of the driving pulley 7 may occur when the motor 6 is started, for example, since the tension of circular belt 5 enlarged by large torque of the driving pulley 7 may extend the spring 19 and displace position of the driving pulley 7, resulting in tension fluctuation of the circular belt 5 itself.

Still another problem is the above belt-drive mechanism 1 is that the tension of the circular belt 5 can not be adjusted with a sufficient precision because the tension of the circular belt 7 is defined only by the tension of the spring 19 depending on extension length of the spring 19, which is to vary according to size dispersion of the circular belt 5, for example.

SUMMARY OF THE INVENTION

Therefore, a primary object of the present invention is to provide a belt-drive mechanism wherein the tension degradation of the circular belt according to time passage and slips of the driving pulley caused by transitional torque are prevented, and a precise tension adjustment of the circular belt is enabled as well, by resolving the above problems.

In order to achieve the object, a belt-drive mechanism of the invention, having a fixed pulley, an adjust pulley, a circular belt which is rounding around the fixed pulley and the adjust pulley, and an adjustment assembly for adjusting a distance between the fixed pulley and the adjust pulley by shifting a position of the adjust pulley, comprises a pair of fastening members for fixing the distance not to vary after the distance is adjusted.

The adjustments assembly comprises:

a coupling member having a screw hole;

a pair of elastic members provided between the coupling member and a shaft of the adjust pulley for tensioning the shaft outward of the circular belt; and an adjusting screw set through a hole of another supporting face to be screwed into the screw hole of the coupling member for shifting a position of the adjust pulley by way of the pair of elastic members by adjusting a distance between the coupling member and said another supporting face.

Each of the fastening members has fitting holes whereto tips of the shaft and the coupling member are to be engaged after the distance between the fixed pulley and the adjust pulley is adjusted.

Therefore, the extension length of the pair of elastic members, and consequently, the distance between the fixed pulley and the adjust pulley can be set and fixed making use of the pair of fastening members according to a desired tension to be given to the circular belt, and the tension degradation of the circular belt because of fatigue of the elastic members due to the passage of time can be prevented, together with slips of the pulleys because of variation of the distance between the pulleys caused by transition of driving torque.

Furthermore, the tension of the circular belt can be easily and exactly adjusted to a designed value by adjusting the position of the adjust pulley with the adjusting screw so that the fitting holes of the pair of fastening members fit to the tips of the shaft and the coupling member.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 2A is a side view of the belt-drive mechanism 21 for illustrating tension adjustment of the circular belt 25;

FIG. 2B is a side view illustrating the belt-drive mechanism 21 after the tension adjustment of the circular belt 25 is performed.

DETAILED DESCRIPTION OF THE PREFERRED EMBODIMENTS

Now, embodiments of the present invention will be described in connection with the drawings.

Figure 1A:
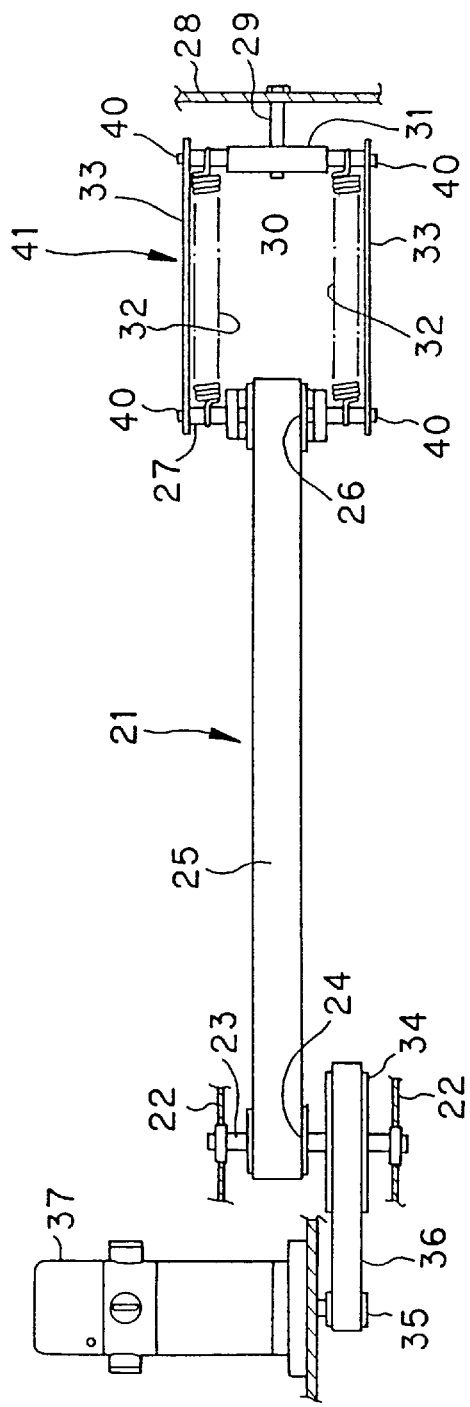
FIG. 1A is a side view illustrating a belt-drive mechanism 21 according to an embodiment of the invention.
Figure 1B:
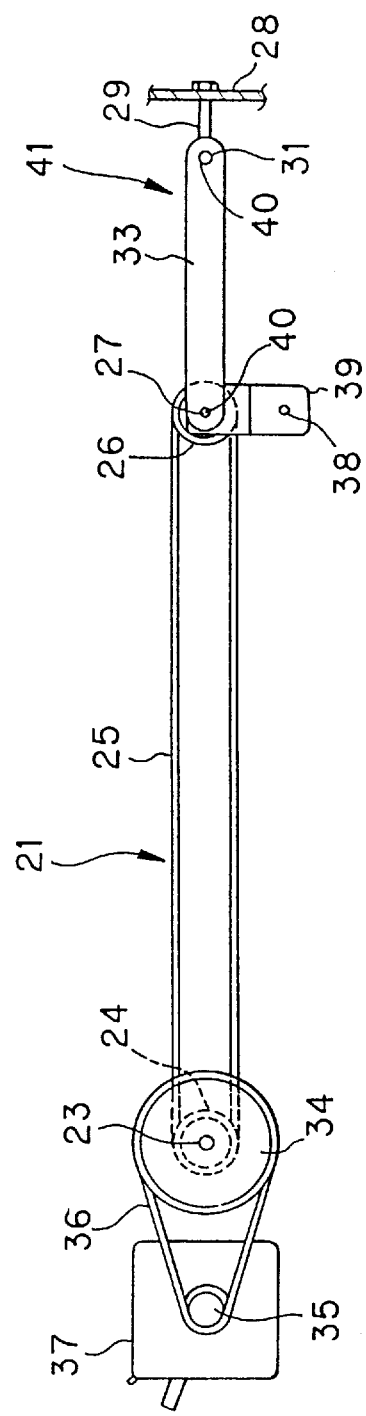
FIG. 1B is a plane view of the belt-drive mechanism 21 of FIG. 1A.
Figure 3:
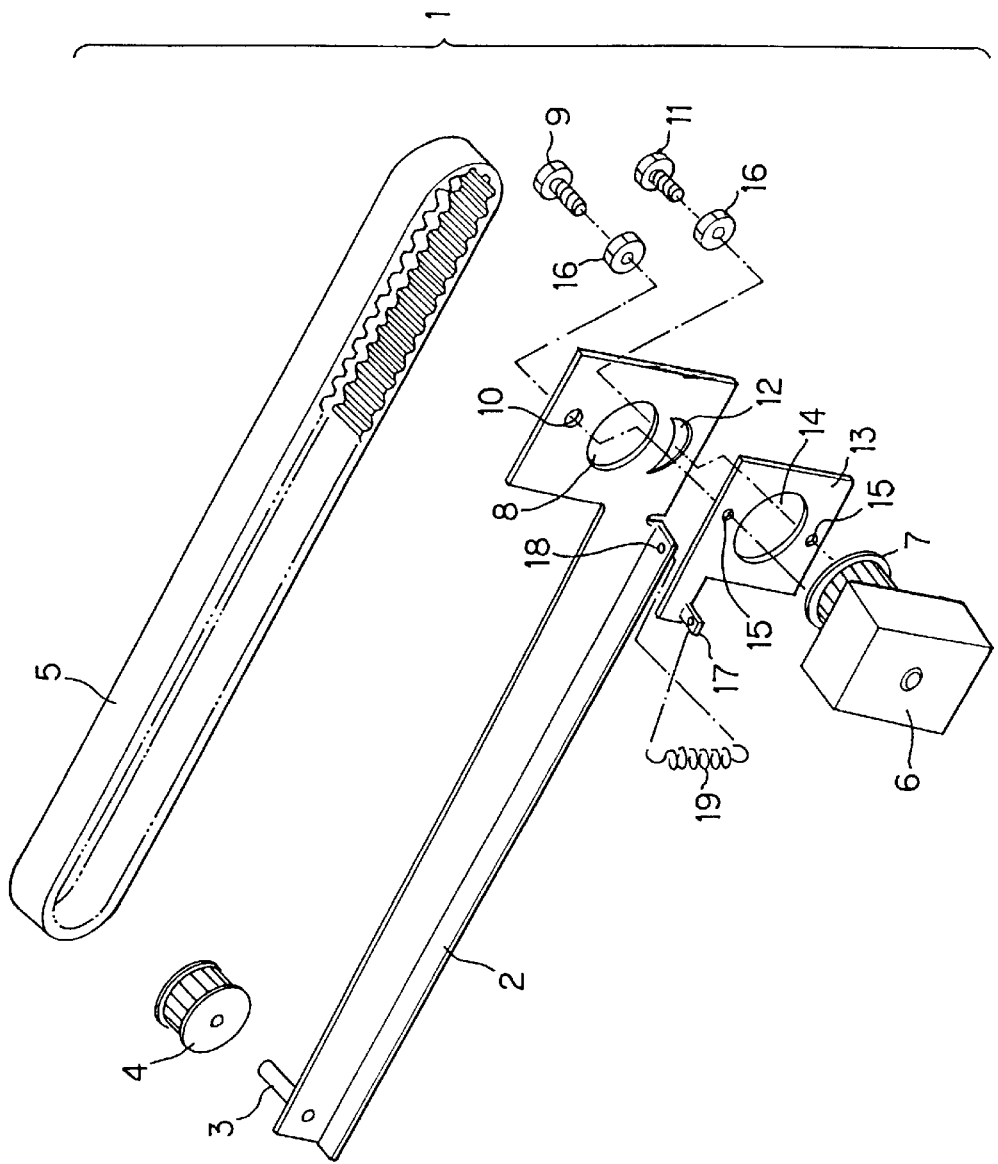
FIG. 3 is a perspective view illustrating an example of a conventional belt-drive mechanism.

FIGS. 1A and 1B are a side view and a plane view, respectively, illustrating a belt-drive mechanism 21 according to an embodiment of the invention.

Referring to FIGS. 1A and 1B, the belt-drive mechanism 21 comprises;

that rotates about a pulley 24 fixed a first shaft 23 attached to supporting faces 22, an adjust pulley 26 which is set able to rotate around a second shaft 27 fixed between supporting plates 39 able to rotate around a third shaft 38, a circular belt 25 rounding around the fixed pulley 24 and the adjust pulley 26, and an adjustment assembly 41 for adjusting a distance between the fixed pulley 24 and the adjust pulley 26 by shifting a position of the adjust pulley 26.

The adjustment assembly 41 comprises a coupling member 31 having a screw hole 30, a pair of elastic members 32 which are set between the second shaft 27 and the coupling member 31 for tensioning circular belt 25, and an adjusting screw 29 set through a hole of another supporting face 28 to be screwed into the screw hole 30 of the coupling member 31 for shifting a position of the adjust pulley 26 by way of the pair of elastic members 32 by adjusting a distance between the coupling member 31 and the supporting face 28.

The belt-drive mechanism 21 further comprises a pair of fastening members 33, which are to be set between both ends of the second shaft 27 and the coupling member 31 so that the distance between the fixed pulley 24 and the adjust pulley 26 may not change. At both ends of each of the fastening members 33, fitting holes 40 are provided each to be engaged with a tip of each of the second shaft 27 and the coupling member 31.

To the belt-drive mechanism 21 of FIGS. 1A and 1B, there is further provided a driving pulley 34 fixed to the first shaft 23, a motor pulley 35 driven by a motor 37 and a motor belt 36 arranged around the driving pulley 34 and the motor pulley 35.

When the motor 37 generates rotary movement, it is transmitted to the fixed pulley 24 through the motor pulley 35, the motor belt 36, the driving pulley 34 and the first shaft 23 to be transmitted further to the adjust pulley 24 by way of the circular belt 25.

FIGS. 2A and 2B are side views of the belt-drive mechanism 21 for illustrating tension adjustment of the circular belt 25.

Referring to FIG. 2A, when the belt-drive mechanism 21 is assembled, the distance between the supporting face 28 and the coupling member 31 is adjusted by screwing the adjusting screw 29 for shifting the position of the adjust pulley 26 by way of the pair of elastic members 32 and the second shaft 27, the pair of fastening members 33 being left detached.

For increasing the tension of the circular belt 25, the adjusting screw 29 is screwed in for reducing the distance between the supporting face 28 and the coupling member 31 to shift the adjust pulley 26 outward of the circular belt 25 for increasing the distance between the fixed pulley 24 and the adjust pulley 26, while the distance between the supporting face 28 and the coupling member 31 is enlarged by screwing out the adjusting screw 29 for shifting the adjust pulley 26 inward of the circular belt 25 to decrease the distance between the fixed pulley 24 and the adjust pulley 26, when the tension of the circular belt is too strong.

Then, after the tension adjustment is performed, the pair of fastening members 33 are set between the second shaft 27 and the coupling member 31 so that the distance between the fixed pulley 24 and the adjust pulley 26 may not change.

Here, it is to be noted that the distance between the two fitting holes 40 provided at both ends of each of the fastening members 33 is designed to correspond to the extension length of the elastic members 32 when the desired tension is given to the circular belt 25. Therefore, by fitting the fitting holes 40 to the tips of the second shaft 27 and the coupling member 31, the adjust pulley 26 can be fixed at a position giving a most appropriate extension length to the pair of elastic members 32.

As above described, the extension length of the pair of elastic members 32, and consequently, the distance between the fixed pulley 24 and the adjust pulley 26 can be set and fixed by the pair of fastening members 33 according to a desired tension to be given to the circular belt 25, in the belt-drive mechanism 21 of the invention. Therefore, the tension degradation of the circular belt 25 because of fatigue of the elastic member due to time passage can be prevented.

Further, there is no problem of slips of the pulleys because of variation of the distance between the pulleys caused by transition of driving torque, as the distance between the fixed pulley 24 and the adjust pulley 26 is fixed by the pair of fastening member 33 with appropriate tension.

Still further, the tension of the circular belt 25 can be easily and exactly adjusted to a designed value by adjusting the position of the adjust pulley 26 with tile adjusting screw 29 so that the fitting holes of the pair of fastening members 33 fit to the tips of the second shaft 27 and the coupling member 31.

Heretofore, the tensioning means provided between the adjust pulley 26 and the coupling member 31 is represented by the pair of elastic members 33 such as a pair of springs, and the fastening means for fixing the distance between the adjust pulley 26 and the coupling member 31 is represented by the pair of fastening members 33 each having two fitting holes to be engaged to the tips of the second shaft 27 and the coupling member 31. However, the scope of the invention is not limited in this embodiment. For example, the pair of elastic members 33 may be replaced by a rubber rod provided with couplers at its both ends each to be engaged to the shaft 27 and coupling member 31, respectively, the pair of fastening member 33 being replaced by a sold plate for fixing length of the rubber rod.

What is claimed is:

1. A belt-drive mechanism comprising:
   a fixed pulley;
   an adjust pulley;
   a circular belt which is arranged around the fixed pulley and the adjust pulley;

an adjustment assembly having a tensioning means extending away from said fixed pulley, said adjustment assembly adjusting a distance between the fixed pulley and the adjust pulley by pulling the adjust pulley by way of said tensioning means; and a fastening means for fixing the distance after the distance is adjusted.

2. A belt-drive mechanism as recited in claim 1, wherein said adjustment assembly comprises:

a coupling member having a screw hole;

the tensioning means provided between the coupling member and a shaft of the adjust pulley for tensioning the shaft by pulling the adjust pulley; and an adjusting screw set through a hole of a supporting face, said adjusting screw to be screwed into the screw hole of the coupling member for shifting a position of the adjust pulley by way of the tensioning means by adjusting a distance between the coupling member and said another supporting face.

3. A belt-drive mechanism as recited in claim 2, wherein said fastening means is a pair of fastening members each having fitting holes that engage ends of the shaft and tips of the coupling member after the distance between the fixed pulley and the adjust pulley is adjusted.

4. A belt-drive mechanism as recited in claim 2, wherein said tensioning means is a pair of elastic members provided between both ends of the shaft and the coupling member.

5. A belt-drive mechanism comprising:

a fixed pulley;

an adjust pulley;

a circular belt which is arranged around the fixed pulley and the adjust pulley;

an adjustment assembly for adjusting a distance between the fixed pulley and the adjust pulley, wherein said adjustment assembly comprises:

a coupling member having a screw hole;

a tensioning means provided between the coupling member and a shaft of the adjust pulley for tensioning the shaft by pulling the adjust pulley; and an adjusting screw set through a hole of a supporting face, said adjusting screw to be screwed into the screw hole of the coupling member for shifting a position of the adjust pulley by way of the tensioning means by adjusting a distance between the coupling member and said supporting face; and a fastening means for fixing the distance after the distance is adjusted, said fastening means comprising a pair of fastening members each having fitting holes that engage ends of the shaft and tips of the coupling member after the distance between the fixed pulley and the adjust pulley is adjusted.

6. A belt-drive mechanism comprising:

a fixed pulley;

an adjust pulley;

a circular belt which is arranged around the fixed pulley and the adjust pulley;

an adjustment assembly for adjusting a distance between the fixed pulley and the adjust pulley, wherein said adjustment assembly comprises:

a coupling member having a screw hole;

a tensioning means provided between the coupling member and a shaft of the adjust pulley for tensioning the shaft by pulling the adjust pulley by way of a tensioning means, said tensioning means comprising a pair of elastic members provided between both ends of the shaft and the coupling member; and an adjusting screw set through a hole of another supporting face to be screwed into the screw hole of the coupling member for shifting a position of the adjust pulley by way of the tensioning means by adjusting a distance between the coupling member and said supporting face; and a fastening means for fixing the distance after the distance is adjusted.

* * * * *